US011977486B2

(12) United States Patent
ElSharif et al.

(10) Patent No.: US 11,977,486 B2
(45) Date of Patent: May 7, 2024

(54) SHADOW POINTER DIRECTORY IN AN INCLUSIVE HIERARCHICAL CACHE

(71) Applicant: International Business Machines Corporation, Armonk, NY (US)

(72) Inventors: Ashraf ElSharif, Austin, TX (US); Richard Joseph Branciforte, Austin, TX (US); Gregory William Alexander, Pflugerville, TX (US); Deanna Postles Dunn Berger, Hyde Park, NY (US); Timothy Bronson, Round Rock, TX (US); Aaron Tsai, Hyde Park, NY (US); Taylor J. Pritchard, Austin, TX (US); Markus Kaltenbach, Tübingen (DE); Christian Jacobi, West Park, NY (US); Michael A. Blake, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 17/712,510

(22) Filed: Apr. 4, 2022

(65) Prior Publication Data
US 2023/0315633 A1 Oct. 5, 2023

(51) Int. Cl.
*G06F 12/0811* (2016.01)
(52) U.S. Cl.
CPC ...... *G06F 12/0811* (2013.01); *G06F 2212/62* (2013.01)
(58) Field of Classification Search
CPC ............. G06F 12/0811; G06F 12/0897; G06F 12/0817; G06F 12/0806; G06F 12/0815;
(Continued)

(56) References Cited

U.S. PATENT DOCUMENTS 7,287,122 B2 * 10/2007 Rajamony ........... G06F 12/0813
711/119
7,509,476 B2    3/2009 Hass et al.
(Continued)

FOREIGN PATENT DOCUMENTS

GB           2516477 A     1/2015
WO     2016209533 A1    12/2016

OTHER PUBLICATIONS

Anonymous "Method for avoiding cache castouts to memory by invalidating local variables in the cache hierarchy" Ip.com; IPCOM000183926D; Jun. 5, 2009 (4 pages).
(Continued)

*Primary Examiner* — Hashem Farrokh
(74) *Attorney, Agent, or Firm* — Cantor Colburn LLP; Nathan Rau

(57) ABSTRACT

A computer system includes a processor core and a memory system in signal communication with the processor core. The memory system includes a first cache and a second cache. The first cache is arranged at a first level of a hierarchy in the memory system and is configured to store a plurality of first-cache entries. The second cache is arranged at a second level of the hierarchy that is lower than the first level, and stores a plurality of second-cache entries. The first cache maintains a directory that contains information for each of the first-cache entries. The second cache maintains a shadow pointer directory (SPD) that includes one or more SPD entries that maps each of the first-cache entries to a corresponding second cache entry at a lower-level cache location.

20 Claims, 11 Drawing Sheets

(58) Field of Classification Search
CPC ............ G06F 12/0846; G06F 12/0826; G06F 2212/62
USPC .................................................. 711/122, 141
See application file for complete search history.

(56) References Cited

U.S. PATENT DOCUMENTS

| | | | |
|---|---|---|---|
| 7,991,977 | B2 | 8/2011 | Hass et al. |
| 8,095,771 | B2 | 1/2012 | Sheu et al. |
| 9,274,959 | B2 | 3/2016 | Habermann et al. |
| 9,971,713 | B2 | 5/2018 | Asaad et al. |
| 10,282,296 | B2 | 5/2019 | Brandt et al. |
| 10,402,344 | B2 | 9/2019 | Hagersten et al. |
| 10,983,821 | B2 | 4/2021 | Zheng et al. |
| 10,983,870 | B2 | 4/2021 | Littlefield et al. |
| 2008/0215848 | A1 | 9/2008 | Sheu et al. |
| 2009/0193192 | A1* | 7/2009 | Burckhardt ......... G06F 12/0831 711/124 |
| 2009/0216949 | A1* | 8/2009 | Krumm ............... G06F 12/0811 711/E12.024 |
| 2014/0082252 | A1* | 3/2014 | Alexander .......... G06F 12/1054 711/E12.024 |
| 2014/0129774 | A1* | 5/2014 | Habermann ........ G06F 12/0811 711/122 |
| 2016/0239434 | A1 | 8/2016 | Berger et al. |
| 2016/0381050 | A1 | 12/2016 | Shanbhogue et al. |
| 2017/0228535 | A1 | 8/2017 | Shanbhogue et al. |
| 2017/0351430 | A1 | 12/2017 | Blankenship et al. |
| 2021/0026783 | A1 | 1/2021 | Helms et al. |

OTHER PUBLICATIONS

Anonymous "Method for differentiating dirty data in multilevel cache hierarchies using coherence states" Ip.com; PCOM000128947D; Sep. 21, 2005 (4 pages).

Anonymous "Method for instruction cache coherence on a processor with disjoint level-2 caches" Ip.com; PCOM000010890D; Jan. 29, 2003 (5 pages).

Northwood "The Full Stack Developer : Your Essential Guide to the Everyday Skills Expected of a Modern Full Stack Web Developer" Nov. 2018; Apress [BOOK].

International Search Report and Written Opinion for International Application No. PCT/IB2023/053165; International Filing Date: Mar. 30, 2023; Date of Mailing: Jul. 6, 2023; 11 pages.

Khasawneh, et al., "SafeSpec: Banishing the Spectre of a Meltdown with Leakage-Free Speculation", Association for Computing Machinery (ACM), 2019, 6 pages.

* cited by examiner

SHADOW POINTER DIRECTORY IN AN INCLUSIVE HIERARCHICAL CACHE

BACKGROUND

Embodiments of the present invention relate in general to computing processing systems, and in particular, computing systems including an inclusive hierarchical cache.

Computing processing systems that employ virtualized environments utilize one or more translation lookaside buffers (TLBs) that cache translations (i.e., mappings of virtual-to-physical addresses) for converting virtual addresses into the physical addresses that indicate the actual location of the requested data in the main memory. The translations stored in the TLBs are typically limited to recent mappings of virtual-physical addresses. By storing recent mappings of virtual-physical addresses in the faster TLBs, the time at which page-table access is reduced thereby improving processor performance.

Cache architectures can be organized according to different properties. For example, caches can be organized according to an "inclusive cache" model. In a computing system that employs an inclusive cache model, the same data can be present in both the L1 and L2 caches. For instance, each upper-level cache component is a subset of the lower-level cache component thereby facilitating increased cache checking speeds.

SUMMARY

According to a non-limiting embodiment, a computer system includes a processor core and a memory system in signal communication with the processor core. The memory system includes a first cache and a second cache. The first cache is arranged at a first level of a hierarchy in the memory system and is configured to store a plurality of first-cache entries. The second cache is arranged at a second level of the hierarchy that is lower than the first level, and stores a plurality of second-cache entries. The first cache maintains a directory that contains information for each of the first-cache entries. The second cache maintains a shadow pointer directory (SPD) that includes one or more SPD entries that maps each of the first-cache entries to a corresponding second cache entry at a lower-level cache location.

According to another non-limiting embodiment, a computer-implemented method is performed by a processor core that includes a memory system in signal communication with the processor core. The method includes storing a plurality of first-cache entries in a first cache arranged at a first level of a hierarchy in the memory system, and storing a plurality of second-cache entries in a second cache arranged at a second level of the hierarchy that is lower than the first level. The method further comprises maintaining in the first cache a directory that contains information for each of the first-cache entries. The method further comprises maintaining in the second cache a shadow pointer directory that includes one or more SPD entries that maps each of the first-cache entries to a corresponding second cache entry at a lower-level cache location.

According to yet another non-limiting, a computer program product controls a computer system. The computer program product comprises a computer readable storage medium having program instructions embodied therewith. The program instructions are executable by an electronic computer processor to control the processor to perform operations comprising storing a plurality of first-cache entries in a first cache arranged at a first level of a hierarchy in the memory system, and storing a plurality of second-cache entries in a second cache arranged at a second level of the hierarchy that is lower than the first level. The method further comprises maintaining in the first cache a directory that contains information for each of the first-cache entries. The method further comprises maintaining in the second cache a shadow pointer directory that includes one or more SPD entries that maps each of the first-cache entries to a corresponding second cache entry at a lower-level cache location.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
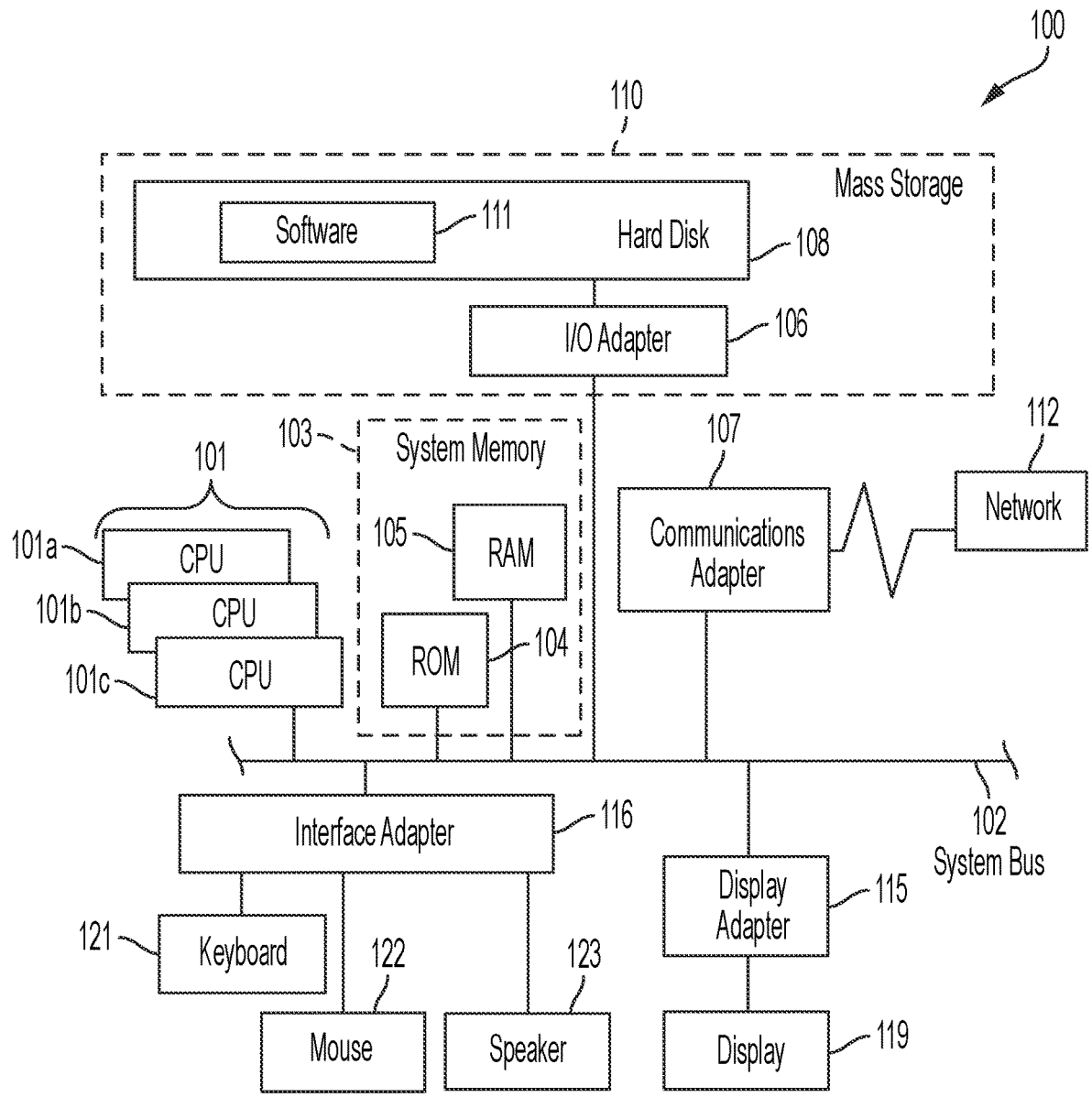
FIG. 1 depicts a block diagram of a computer system for implementing some or all aspects of one or more non-limiting embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

A computing system that implements an inclusive cache hierarchy can include multiple processor that can request a cache entry (sometimes referred to as a "cache line". The cache entry includes the actual data in the cache, along with the directory entry and the corresponding address. Therefore, there is a need for coherent access to those cache lines, along with a need to cross-interrogate ("XI") and possibly invalidate the higher-level cache (e.g., the level one or "L1" cache) in order obtain the latest data and maintain coherency. If the higher-level cache, e.g., L1 instruction cache (L1I) and the L1 data cache (L1D) is logically indexed/tagged, the lower-level caches (e.g., the L2 cache) are absolutely indexed/tagged, which can result in the creation of synonym cache lines, sometimes referred to as a "synonym conflict" A synonym conflict occurs when multiple higher level cache locations (e.g., L1 locations) are mapped to a single lower-level cache location (e.g., a single level two or "L2" location).

The L2 cache is typically responsible for resolving these synonym conflicts by sending an XI request to the L1 caches to invalidate the synonym, before sending fetch data back to the requesting L1 cache. When the L2 moves to XI the L1 and the L2 has no knowledge of where the cache line exists on the L1, then the L1 needs to perform an extra step of translating an absolute address (also referred to as a "real address" in some computing systems) of the XI into a vector of locations. However, the cache line may exist in the L1 cache which would mean the L1 cache would need to maintain a structure for translating absolute addresses to logical addresses (also referred to as "effective addresses" or "virtual addresses" in some computing systems). Otherwise, the L2 must be allowed to over XI the cache lines which causes reduced computing performance.

According to one or more non-limiting embodiments, a computer processing system is provided that includes a shadow pointer directory (SPD) configured to operate in an inclusive cache hierarchy. The shadow pointer directory provides the lower level cache (e.g., L2) knowledge of the higher-level L1 cache by "shadowing" the L1 cache. In one or more non-limiting embodiments, the L1 cache maintains a pointer directory that maps, for every L1 entry, the corresponding lower-level cache location (e.g., L2 cache location). The lower-level L2 maintains a shadow copy of this directory for both the L1 data cache (L1D) and the L1 instruction cache (L1I). A SPD "hit" indicates that an address associated with a cache entry or "cache line" in the L1 cache has a matching entry in the shadow pointer directory. The shadow pointer directory can then be used to detect synonym cache lines and filter XI requests.

By shadowing the L1 cache, the lower-level L2 cache is provided visibility of where the XI needs to be located in the higher-level L1 cache so that the lower-level L2 cache can be assigned with the responsibility to generate the XI vector. Shadowing the L1 cache using a plurality of parallel arrays (e.g., four parallel arrays) also allows synonym cache lines to be looked up concurrently (i.e., in parallel) rather than sequentially. The knowledge of the synonym cache lines can be provided to the lower-level L2 cache and used to effectively filter the XI requests.

FIG. 1 illustrates a computer system 100 configured to implement some or all aspects of one or more non-limiting embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS), which controls certain basic functions of the computer system 100. The RAM 105 is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
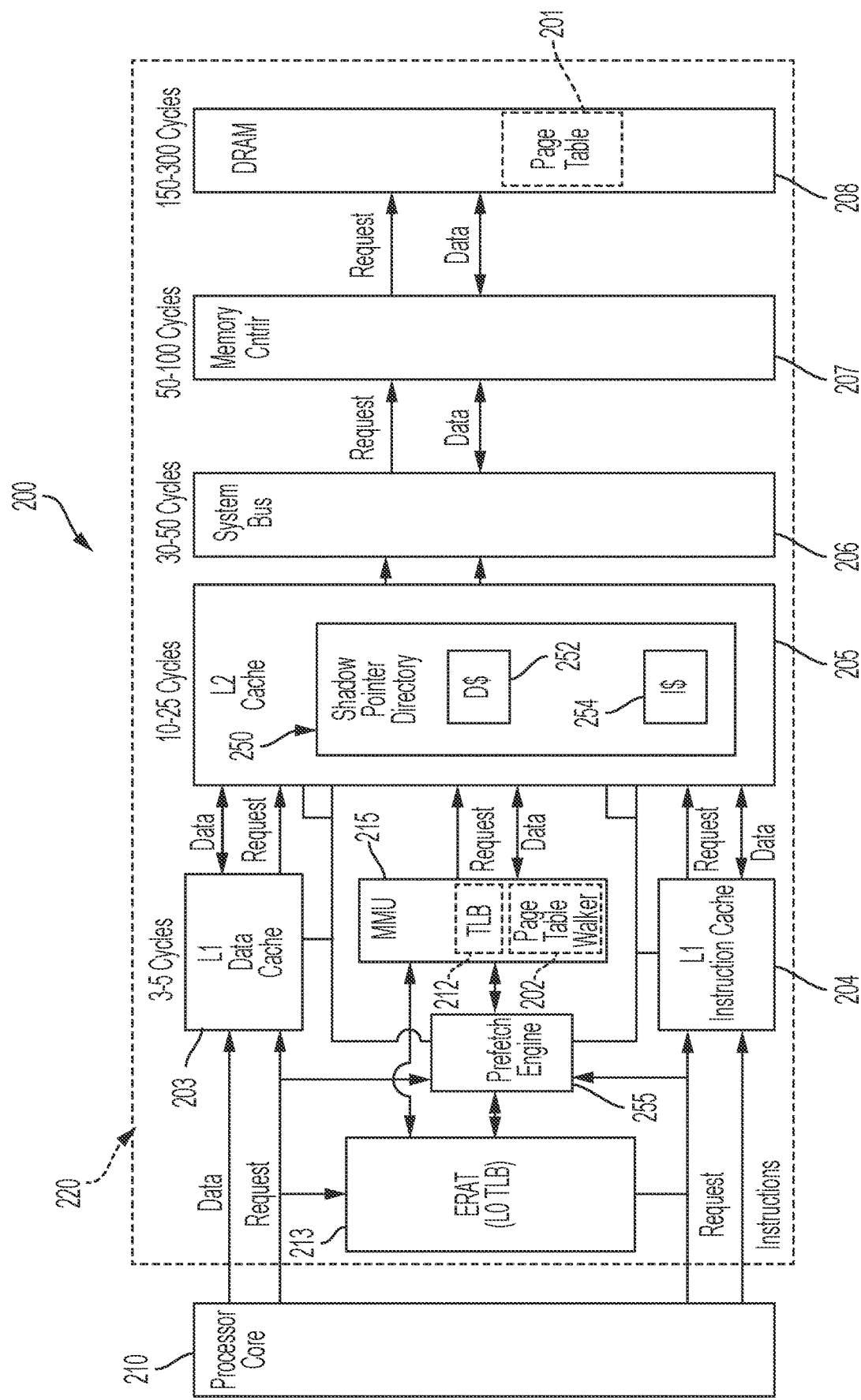
FIG. 2 depicts a block diagram of a computer processing system including a shadow pointer directory operable in an inclusive cache hierarchy according to a non-limiting embodiment of the invention.

Turning now to FIG. 2, a computer processing system 200 configured to perform cache prefetching according is illustrated according to non-limiting embodiments of the invention. The computer processing system 200 includes a processor 210 in signal communication with a memory system 220. The processor 210 can be constructed as a central processing unit (CPU) configured to execute an operating system (OS).

The memory system 220 includes several levels of caches (e.g., L1 caches 203/204, L2 cache 205), a memory management unit (MMU) 215, a system bus 206, a memory controller 207, main memory (DRAM) 208, an ERAT 213, and a prefetch engine 255. The caches 203, 204, and 205 are relatively smaller than the main memory 208, but run faster than the main memory 208. In one or more non-limiting embodiments, the L1 cache 203/204 is quicker than the lower caches, e.g., the L2 cache 205. For example, the L1 cache 203/204 can have a latency of 3 to 5 cycles (e.g., based on the system architecture), while the L2 cache has a latency of 12 cycles. In a non-limiting embodiment, the L1 caches 203 and 204 and the L2 cache 205 are designed according to an inclusive cache hierarchy. For example, the L1 cache (collectively referred to as L1 203/204) is split into an L1 data cache 203 and an L1 instruction cache 204, and is considered a larger-sized higher-level cache compared to the L2 cache 205. Because the L1 cache 203/204 and L2 cache 205 are arranged according to an inclusive cache hierarchy, the same data can be present in both the L1 and L2 caches. In addition, the L1 cache 203/204 is considered a faster cache compared to the L2 cache 205. Although a single lower-level cache (e.g., L2 205) is illustrated, it should be apricated that additional lower-level caches (e.g., L3, L4, etc.) can be employed without departing from the scope of the invention.

As described herein, the prefetch engine 255 can monitor a demand access stream including one or more demand access requests generated by the processor 210 and issue one or more prefetch requests such that data can be loaded from the larger, slower main memory 208 to the relatively smaller, faster caches 203/204 and 205 in order to make it more readily available to the processor 210 when needed. In one or more embodiments, the prefetch engine 255 can process several streams of prefetch requests simultaneously or in parallel.

The MMU 215 (also referred to as a "translation unit" (XU unit) in some systems) includes one or more translation lookaside buffers (TLBs) 212, and a page table walker 202. The MMU 215 executes a selected paging algorithm to determine and maintain the current mappings from virtual addresses (VAs) to RAs using one or more page tables (PTs) 201. When an address is received from an execution unit in the processor 210, the MMU 215 will translate a VA to an RA using the page tables 201. In one or more non-limiting embodiments, the page tables 201 can be located in the main memory (e.g., DRAM 208) and the page table walker 202 can be invoked to access the page tables 201, and provide appropriate translation. It should be appreciated that the location of the page table walker 202 is not limited to the MMU 215 can be located elsewhere such as the memory controller 207, for example, without departing from the scope of the invention.

When the processor 210 executes memory access instructions (e.g. load, store) while operating in the virtual mode, it presents an EA to the L1 cache 203/204. The MMU 215 converts the EA into the corresponding RA, which is required for accessing the data (including in some systems, an intermediate VA).

The ERAT 213 can serve as a highest-level TLB (e.g., L0 TLB) and caches a limited number of previous ERATs in anticipation of their reuse. Although the ERAT 213 is shown as being external from the MMU 215, it should be appreciated that the ERAT 213 can be located elsewhere such as integrated in the MMU 215, for example, without departing from the scope of the invention. If the required translation is found in the ERAT 213, the process within the MMU 215 can be bypassed. A similar process occurs when the processor 210 fetches new instructions for execution. In one or more non-limiting embodiments, real address (RA) (also referred to as an "absolute address" (AA) in some systems) can be determined, and may be used to validate an entry found in the L1 cache 203/204 or if no match is found in the L1 cache 203/204, the RA is presented to the L2 cache 205. If the line misses in the L1 cache 203/204, then once the RA is determined the RA is presented to the L2 cache 205. In cases where there is also no match found in the L2 205 cache, the RA is propagated to the memory subsystem (e.g., lower level caches) to access the required data.

In one or more non-limiting embodiments, the system 200 may replace the ERAT 213 with a logical directory. The logical directory effectively serves as the first level TLB, where cache 205 serves as a second level TLB or TLB2.

A unique address translation is required for each memory page. As an example, a page may contain 4 kilobytes (KB), 64 kilobytes, or other larger amounts of DRAM 208 storage. The TLBs 212 can be designed as content addressable memory (CAM) and can contain an entry for each of the most recently required translation. Requests for entries can be loaded in a buffer or "mailbox" before they are submitted to a given TLB 212, which processes one request per cycle. Occasionally, an address will be presented to the MMU 215 that does not have a matching translation in the TLBs 212. When this happens, a TLB miss is declared and the page table walker 202 is activated to search the complete PT 201 stored in DRAM 208.

The page table walker 202 typically includes a hash function to facilitate one or more memory accesses and processing of individual page table entries (PTEs) in the resulting data to locate the required PTE. In one or more embodiments, the page walks performed by the page table walker 202 can be tree traversals. Once the page table walker 202 has retrieved the required PTE, this new PTE is used to complete the required address translation, and the pending memory access process continues as with normal accesses. The new PTE displaces another PTE within a respective TLB 212, based on time since last use. A last recently used (LRU) mechanism similar to that used in caches determines which previous TLB entry to displace.

The prefetch engine 255 is in signal communication with the processor 210, the ERAT 213 and the MMU 215. The prefetch engine 255 is configured to monitor the demand access requests sent from the processor 210 and output prefetch demands to the MMU 215 indicating EAs for page lines it desires to prefetch. In one or more non-limiting embodiments, the prefetch engine 255 can generate a stream of highly-speculative leading prefetch requests, which can then be passed to the caches 203/204 and 205 according to the cache hierarchy. Thus, in contrast to demand accesses (e.g., demand load requests), the leading prefetch requests (as well as other prefetch requests) are not generated in response to execution of an instruction set architecture (ISA) instruction by the instruction execution circuitry of the processor 210, but are rather generated by the prefetch engine 255 in anticipation of execution of one or more ISA instructions that implicitly or explicitly indicate memory access. Although the leading prefetch requests accesses each cache 203/204 and 205 of the cache hierarchy, it is generally the case that the target memory blocks of leading prefetch requests do not initially reside in the cache memory hierarchy and or obtained from the main memory 208 and passed up the cache hierarchy.

Subsequent to a leading prefetch request and nearer in time to an anticipated demand memory access request (e.g., demand load or store request), the prefetch engine 255 can issue a corresponding trailing prefetch request (e.g., an L1 prefetch request) targeting the same target memory block. The trailing prefetch requests are typically much less speculative than the leading prefetch requests.

When a demand load misses the L1 cache, it allocates a Load Miss Queue entry and attempts translation via the ERAT (e.g., L0 TLB). When operating in the virtual mode, the ERAT 213 returns the real address of the miss and performs security checks. After all checks are passed, the ERAT 213 allows the demand miss to be sent out of the processor 210 and the Load Miss Queue is updated accordingly. In the real mode, however, the miss will wait until it is the next to complete (NTC) instruction before the ERAT 213 services the load. As described herein, no translation is performed when operating in the real mode, but the ERAT 213 will still ensure that the load is safe before it is sent out of the processor 210 and the Load Miss Queue is updated accordingly.

In one or more non-limiting embodiments, the computing system can include prefetch engine 255 that employs a Prefetch Request Queue (PRQ) and a Load Miss Queue (LMQ) When operating in the virtual mode, the PRQ can allocate a new prefetch stream at any point, including when a load miss occurs. In the real mode, however, the PRQ in the prefetch engine 255 is only allowed to allocate after an LMQ entry has been allocated and has been allowed to send its miss request out of the processor 210 (i.e. after passing strict address checks performed by the ERAT 213) to ensure that the prefetches that follow the load are safe. In some instances, the control logic of the prefetch engine 255 may initiate an L2 cache prefetch operation in response, for example, to a demand load during instruction processing (e.g., monitoring the demand access generated by the processor 210).

The shadow pointer directory 250 is implemented in the L2 cache 205. According to a non-limiting embodiments, The L1 cache 203/204 maintains a directory that contains information for each of the L1 cache entries. The L2 cache 205 maintains the shadow pointer directory 250 that includes one or more SPD entries that maps each of the L1 cache entries to a corresponding second cache entry at a lower-level cache, e.g., an L2 cache entry. Thus, the shadow pointer directory 250 effectively "shadows" or approximately matches the L1 cache 203/204 with no under-indication of ownership, and provides the L2 cache 205 with knowledge of the higher-level L1 cache 203/204. In this manner, the L1 cache 203/204 can maintain a directory having the information required to determine a cache hit in the L1 cache 203/204, but may not track the information required to process invalidates, which includes the pointer to a lower-level cache location (e.g., a location in the L2 cache 205, a location in a L3 cache, etc.) because that can instead be tracked in the shadow pointer directory 250.

The reads and writes of the shadow pointer directory 250 are pipelined according to a defined number of cycles. For a memory system 200 that includes an L1 cache 203/204 with a latency of 5 cycles, for example, the shadow pointer directory reads and writes are pipelined according to cycles C0, C1, C2, C3 and C4 (C0→C4).

In one or more non-limiting embodiments, the L2 cache 205 maintains a first shadow pointer directory copy (D$)

252 that corresponds to the L1 data cache 203 and a second pointer shadow directory copy (I$) 254 that corresponds to the L1 instruction cache 204. Accordingly, the shadow pointer directory 250 can serve as a dedicated directory which provides precise knowledge pertaining to the occupancy of the L1 cache 203/204 since the L2 cache 205 is provided with knowledge of when a cache line was evicted from the L1 cache 203/204.

The shadow pointer directory 250 also improves computing performance when performing L2 cross-interrogation of the L2 cache 205. For instance, the shadow pointer directory 250 provides the L2 cache 205 with visibility of where a cross-interrogation (XI) needs to be located in the L1 cache 203/204 so that the L2 cache 205 itself can generate an XI vector for performing the cross-interrogation. Since the L1 entries are essentially "shadowed" in the shadow pointer directory 250 synonym cache lines can be looked up concurrently and provided to the L2 cache 205 to effectively filter the cross-interrogations.

In one or more non-limiting embodiments, a vector mask can be generated to "switch off" the XI vector bits for read instructions that are trailing a write instruction. For example, the vector mask has the same size (e.g., same number of bits) as the XI vector. When the system detects an XI read trailing a write to the shadow pointer directory 250, the bits of the vector mask are set to zero (0). Otherwise, the bits of the vector mask are set to one (1). The vector mask is then logically applied (e.g. AND'd) to the XI vector and the resulting vector (e.g., the bit-wise AND resultant vector) is output having the XI vector bits corresponding to reads that are trailing a write switched off. By switching off the bits corresponding to reads that are trailing a write, the XI requests are prevented from being sent when the system 200 detects that an XI request is trailing behind a write/invalidate.

Figure 3:
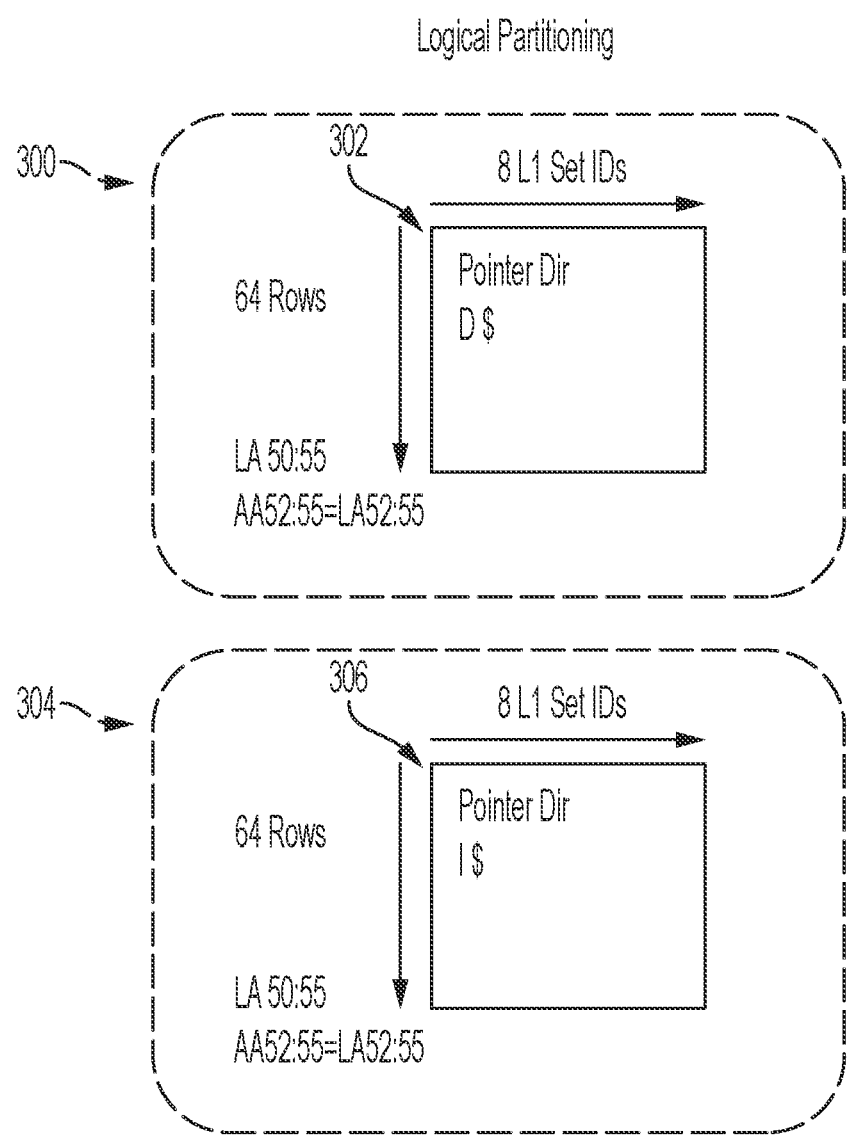
FIG. 3 are block diagrams depicting the logical partitioning of a L1 data cache shadow pointer directory and a L1 instruction cache shadow pointer directory according to a non-limiting embodiment of the invention.

FIG. 3 depicts a first logical partitioning 300 of a data cache shadow pointer directory (D$) synonym 302 associated with the L1 data cache 203 and a second logical partitioning 304 of an instruction shadow pointer directory (I$) synonym 306 associated with the L1 instruction cache 205 according to a non-limiting embodiment of the invention. Each of the data cache shadow pointer directory (D$) synonym 302 and the instruction shadow pointer directory (I$) synonym 306 includes 64 rows, each row including eight (8) L1 set identifiers (IDs). The non-limiting embodiment described herein employs 8 L1 sets because the L1 cache 203/204 is 8-way set associative. It should be appreciated that a 4-way set associate L1 cache would employ 4 L1 sets and thus 4 L1 set IDs. In any case, each L1 set ID corresponds to an individual entry field, which is discussed in greater detail below.

The directory corresponding to each of the L1 data cache shadow pointer directory (D$) synonym 302 and the L1 instruction shadow pointer directory (I$) synonym 306 are logically indexed by an L1 Congruence Class address and non-translated Logical/Absolute Address bits (also referred to as Effective/Real Address bits in some computing systems). In one or more non-limiting embodiments, the shadow pointer directory 250 is logically indexed by the L1 Congruence Class address that is defined using bits 50:51, while the Logical/Absolute Address bit is defined using bits 52:55.

Figure 4:
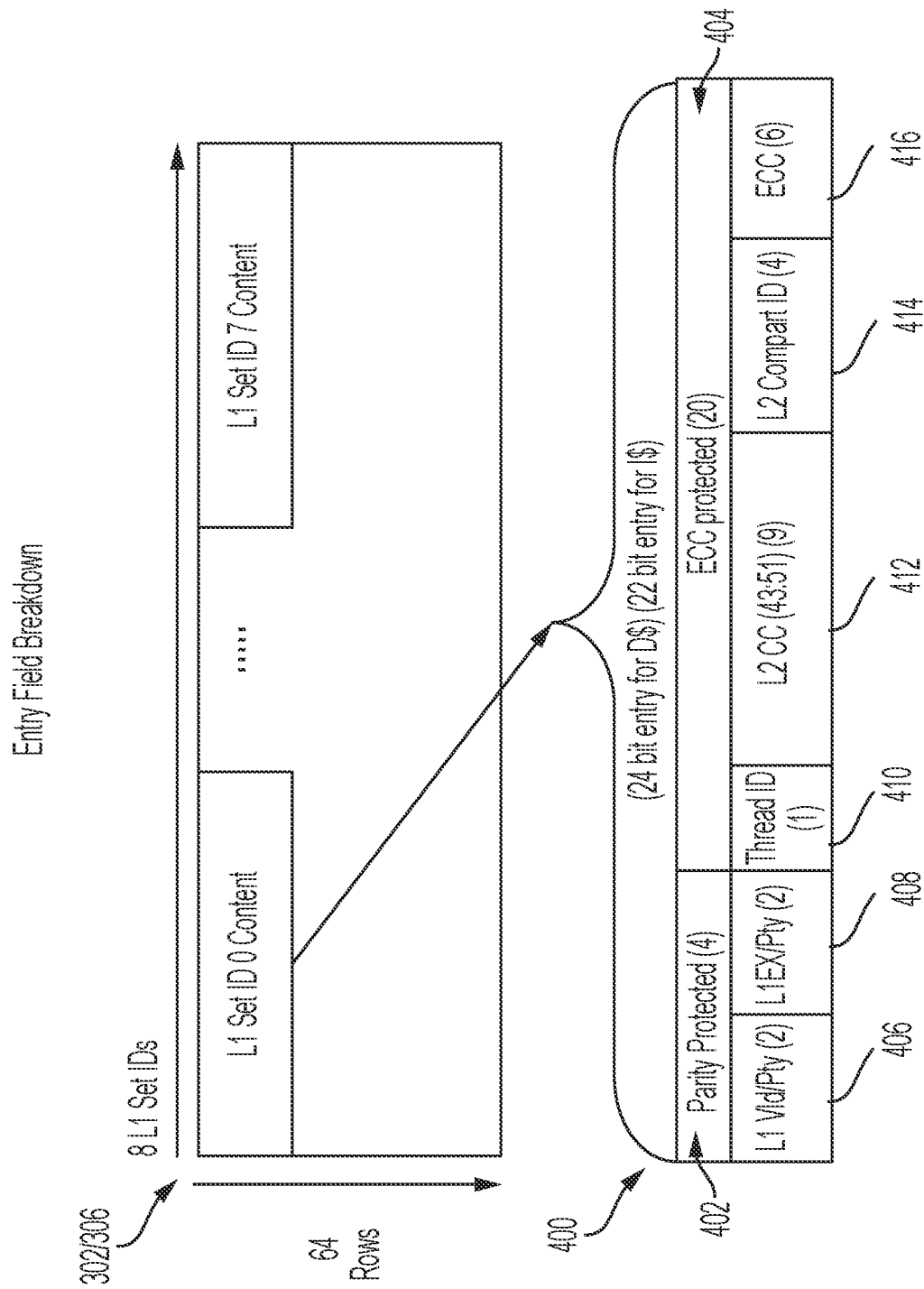
FIG. 4 is a block diagram depicting a shadow pointer directory entry field according to a non-limiting embodiment of the invention.

FIG. 4 illustrates a shadow pointer directory entry field 400 according to a non-limiting embodiment of the invention. As described herein, each row included the data cache shadow pointer directory (D$) synonym 302 and the instruction shadow pointer directory (I$) synonym 306 (collectively referred to as 302/306 in FIG. 4) includes eight (8) L1 set IDs, and each L1 set ID corresponds to an individual entry field 400. In one or more non-limiting embodiments, the entry field 400 for the data cache shadow pointer directory (D$) 302 is twenty-four (24) bits wide, while the entry field 400 for the data cache shadow pointer directory (D$) 306 is twenty-four (22) bits wide. The entry field 400 incudes parity protected fields 402 and error correction code (ECC) protected fields 404. The parity protected fields 402 allows for updating the bits in these fields quickly and independent from the ECC protected fields. To invalidate an entry, for example, the parity protected fields 402 can be updated without the need to update the ECC protected fields 404.

In terms of an individual D$ entry for the data cache shadow pointer directory (D$) synonym 302 the parity protected fields 402 include a two-bit valid field (L1 Vld/Pty) and a 2-bit exclusive field (a L1EX/Pty), while the ECC protected fields 404 include a 1-bit thread identification field (Thread ID), a 9-bit congruence class field (L2 CC), a 4-bit compartment ID field (L2 compartment ID), and a 6-bit ECC field (ECC). In terms of an individual I$ entry for the instruction cache shadow pointer directory (I$) synonym 306, the parity protected fields 402 includes the two-bit valid field (L1 Vld/Pty)—omitting the 2-bit exclusive field (a L1EX/Pty), while the ECC protected fields 404 include the 1-bit thread identification field (Thread ID), the 9-bit congruence class field (L2 CC), the 4-bit compartment ID field (L2 compartment ID), and the 6-bit ECC field (ECC). Accordingly, the data cache shadow pointer directory (D$) synonym 302 has a total of 24 bits, while the instruction cache shadow pointer directory (I$) synonym 306 has a total of 22 bits due to the omission of the L1EX/Pty bits.

Figure 5:
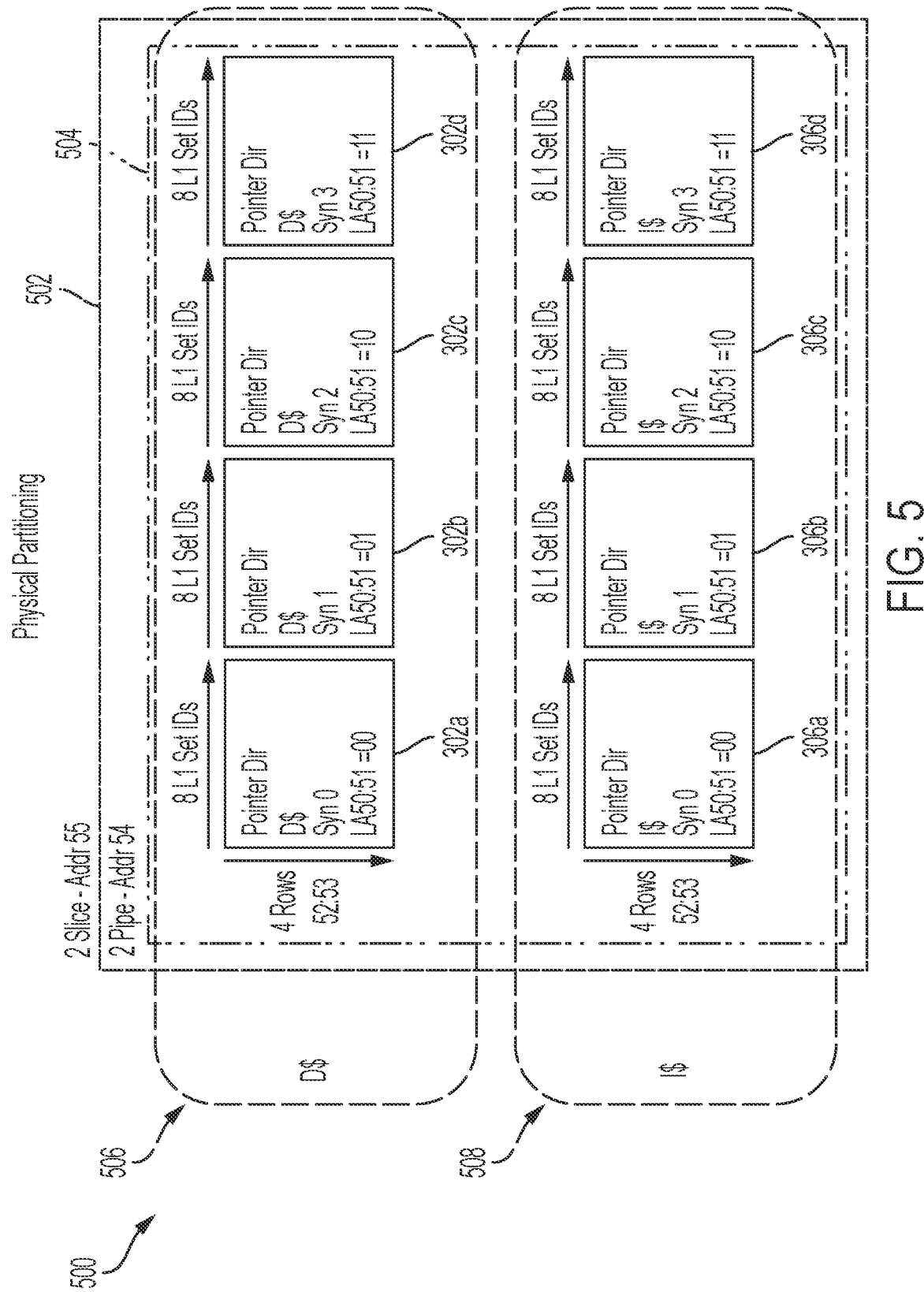
FIG. 5 are block diagrams depicting the physical partitioning of the L1 data cache shadow pointer directory and a L1 instruction cache according to a non-limiting embodiment of the invention.

Turning to FIG. 5, a physical partitioning 500 associated with the L1 data cache shadow pointer directory (D$) and the L1 instruction shadow pointer directory (I$) is illustrated according to a non-limiting embodiment of the invention. The physical partitioning 500 includes a group of slices 502 (e.g., two slices), where each slice 502 includes a group of pipelines 504 (e.g., two pipelines).

Each pipeline 504 includes a plurality of L1 data cache shadow pointer directory (D$) arrays 506 and a plurality of L1 instruction cache shadow pointer directory (I$) arrays 508. Each array 506 and 508 is configured to store a plurality of individual synonyms. For example, the L1 data cache shadow pointer directory (D$) 506 includes a plurality of rows (e.g., four (4) rows), and each row includes a plurality of (e.g. four (4)) data cache shadow pointer directory (D$) synonyms 302a, 302b, 302c, 302d to define a 4-deep array. Each of these data cache shadow pointer directory (D$) synonyms 302a, 302b, 302c, 302d have eight congruence classes and set IDs. Likewise, the L1 data cache shadow pointer directory (I$) 508 includes 4 rows, each row including four instruction cache shadow pointer directory (I$) synonyms 306a, 306b, 306c, 306d to define a 4-deep array. Each of these instruction cache shadow pointer directory (I$) synonyms 306a, 306b, 306c, 306d have eight congruence classes and set IDs per row (e.g. 4 rows). Thus, all thirty-two congruence classes and set IDs for the L1 data cache shadow pointer directory (D$) 506 and all thirty-two congruence classes and set IDs for the L1 instruction cache shadow pointer directory (I$) 508 are compared to the L2 cache 205 to determine a hit in the shadow pointer directory 250. Also when performing an L1 cache look-up, the four rows in data cache shadow pointer directory (D$) array 506 can be looked up simultaneously with the four rows in instruction cache shadow pointer directory (I$) array 508.

Figure 6A:
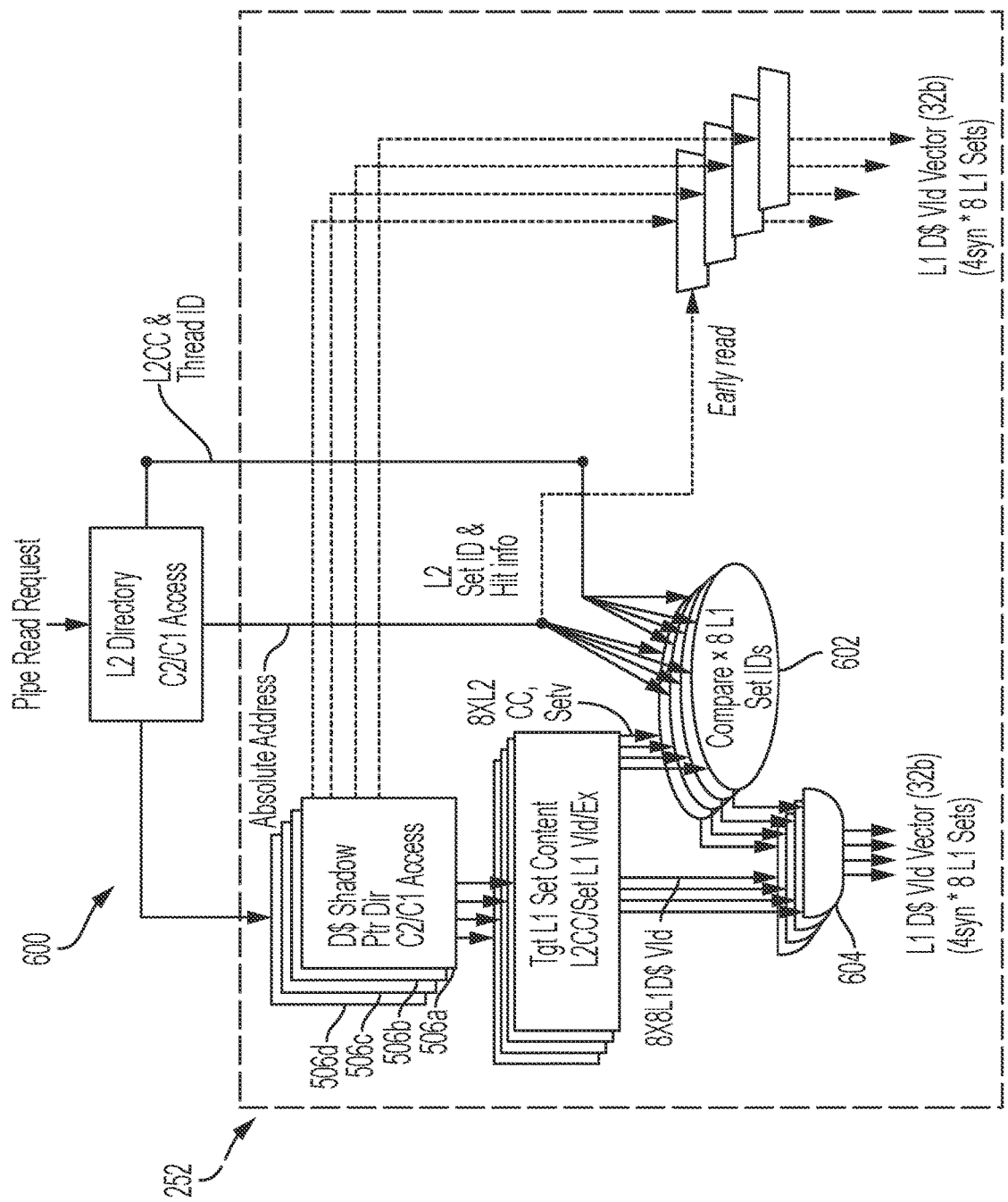
FIG. 6A is a diagram depicting a shadow pointer directory read path of a shadow pointer directory corresponding to an L1 data cache according to a non-limiting embodiment of the invention.
Figure 6B:
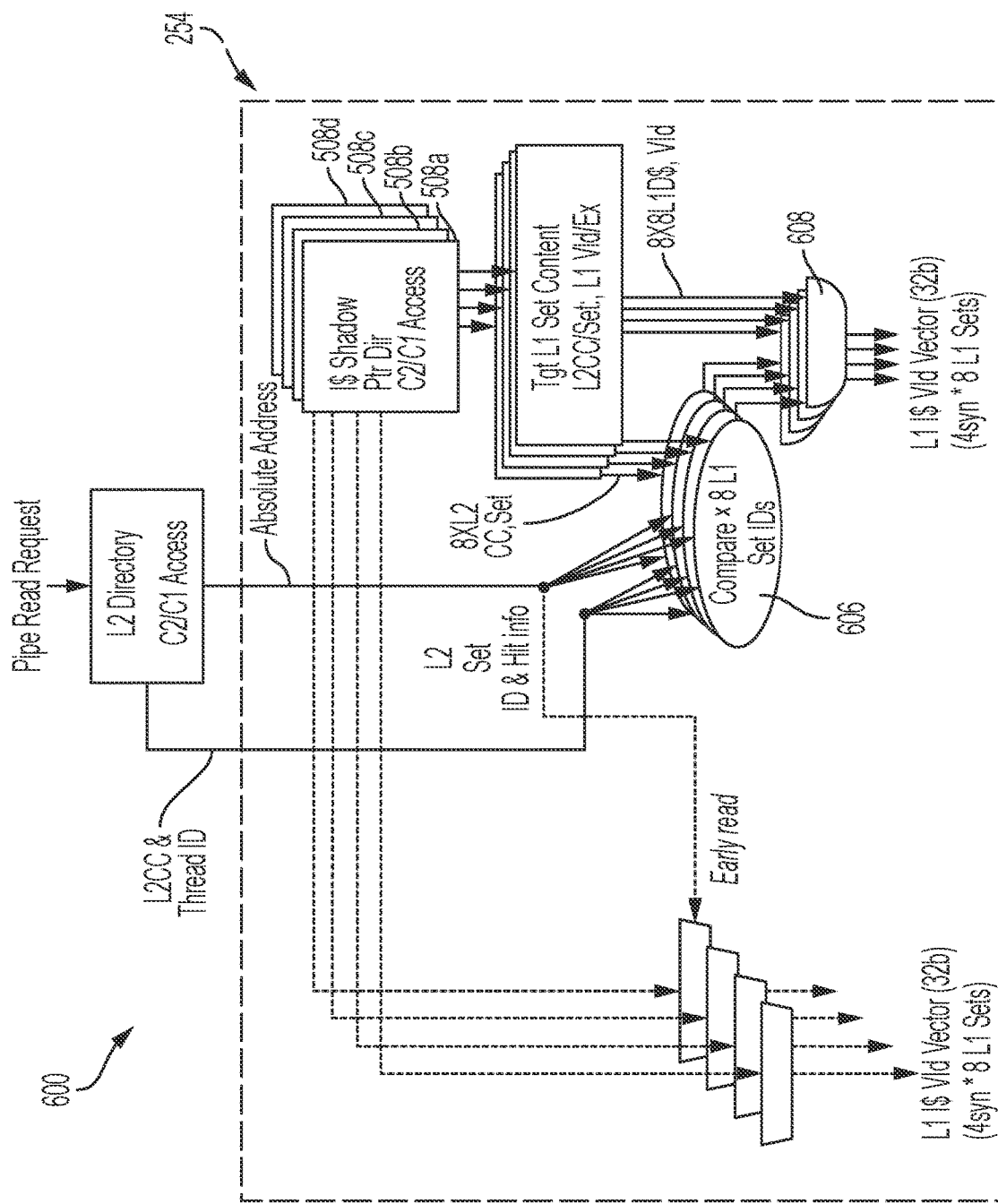
FIG. 6B is a diagram depicting a shadow pointer directory read path of a shadow pointer directory corresponding to an L1 instruction cache according to a non-limiting embodiment of the invention.

FIGS. 6A and 6B, diagrams collectively depict a shadow pointer directory read path 600 of the shadow pointer directory 250 according to a non-limiting embodiment of the invention. FIG. 6A depicts a shadow pointer directory read path of the data shadow pointer directory (D$) 252 corresponding to an L1 data cache, while FIG. 6B depicts a shadow pointer directory read path of the instruction shadow pointer directory (I$) 254 corresponding to an L1 instruction cache. The shadow pointer directory 203/204 is read on SPD snoops, XIs and/or L1 implicit evictions. More specifically, the shadow pointer directory read path 600 compares snooped entries from the data shadow pointer directory (D$) 252 and the instruction shadow pointer directory (I$) 254 with absolute addresses (sometimes referred to as a "real address" in some systems) included in the L2 cache 205 to determine a hit or miss in the data shadow pointer directory (D$) 252 and the instruction shadow pointer directory (I$) 254, respectively. For example, a pipe read request is received which indicates an absolute address to be snooped in the shadow pointer directory 250 (e.g., the data shadow pointer directory (D$) 252 and the instruction shadow pointer directory (I$) 254). The pipe read request is delivered not only to the data shadow pointer directory (D$) 252 and the instruction shadow pointer directory (I$) 254, but also to the L2 cache 205 which is indexed by the L2 congruence class.

Based on the absolute address indicated by the pipe read request, the L2 cache 205 produces 16 results including an L2 set ID and "hit information" indicating whether a hit occurred one of the entries in the L2 cache 205. The hit information can indicate which compartment/set ID in the L2 realized a hit corresponding to the absolute address indicated by the pipe read request. In other words, the hit information indicates the congruence class (used to index the L2 directory) and which compartment, if any, realized a hit.

The set ID and hit information produced by the L2 cached 205 is used to determine whether a hit occurred in the in the shadow pointer directory 250 (e.g., the data shadow pointer directory (D$) 252 and the instruction shadow pointer directory (I$) 254). The L1 data shadow pointer directory (D$) 252 provides four data cache shadow pointer directory (D$) arrays 506a-506d, with each data cache array 506a-506d including four data cache shadow pointer directory (D$) synonyms (e.g., 302a, 302b, 302c, 302d show in in FIG. 5). Based on the pipe read request, each L1 data shadow pointer directory (D$) 252 produces eight L1 data cache shadow directory valid bits 8×[L1D$ Vld] and eight L2 CC, Set index vectors 8×[L2 CC,L2 Set].

Likewise, the L1 instruction shadow pointer directory (I$) 254 provides four instruction cache shadow pointer directory (I$) arrays 508a-508d, with each instruction cache array 508a-508d including four instruction cache shadow pointer directory (I$) synonyms (e.g., 306a, 306b, 306c, 306d show in in FIG. 5). Based on the pipe read request, each L1I$ instruction shadow pointer directory array (I$) 254 produces eight L1 instruction cache shadow directory valid bits 8×[L1I$ Vld] and eight L2 CC, Set index vectors 8×[L2 CC, L2 Set].

Each of the data shadow pointer directory (D$) 252 and the instruction shadow pointer directory (I$) 254 receive the set ID and "hit information" indicating whether a hit occurred one of the entries in the L2 cache 205, along with the L2 congruence class and thread ID associated with the pipe read request. The data shadow pointer directory (D$) 252 utilizes comparators 602 to compare the set ID and "hit information" along with the L2 congruence class and thread ID with the L2 CC, Set index vectors 8×[L2 CC, L2 Set]. Accordingly, the comparators 602 compare the 4×8 (32) data shadow pointer directory (D$) entries [CC,SET] to the pipe-line CC entries, and L2 directory resultant L2 sets. Each result of the comparison is delivered to an L1 data cache AND gate 604.

The outputs of the data cache AND gates collectively define a 32-bit L1 data cache valid vector (L1 D$ Vld) which indicates one or more hits in the data shadow pointer directory (D$) 252 and the location of a corresponding hit. For instance, a logic "1" output indicates a hit in the data shadow pointer directory (D$) 252 while a logic "0" output indicates a miss. In addition, the resulting vectors from the data shadow pointer directory (D$) AND gates also can indicate whether a hit entry is an exclusive copy of the entry.

In a similar manner, the instruction shadow pointer directory (I$) 254 utilizes comparators 606 to compare the set ID and "hit information" along with the L2 congruence class and thread ID with the L2 CC, Set index vectors 8×[L2 CC,L2 Set]. Accordingly, the comparators 606 compare the four instructions shadow pointer directory (I$) entries [CC, SET] to the pipe-line CC entries, and a L2 directory resultant L2 sets. Each result of the comparison is delivered to an L1 instruction cache AND gate 608. The outputs of the AND gates collectively define a 32-bit L1 instruction cache valid vector (L1 I$ Vld) which indicates one or more hits in the instruction shadow pointer directory (I$) 254. For instance, a logic "F" output indicates a hit in the instruction shadow pointer directory (I$) 254 while a logic "0" output indicates a miss.

Figure 7:
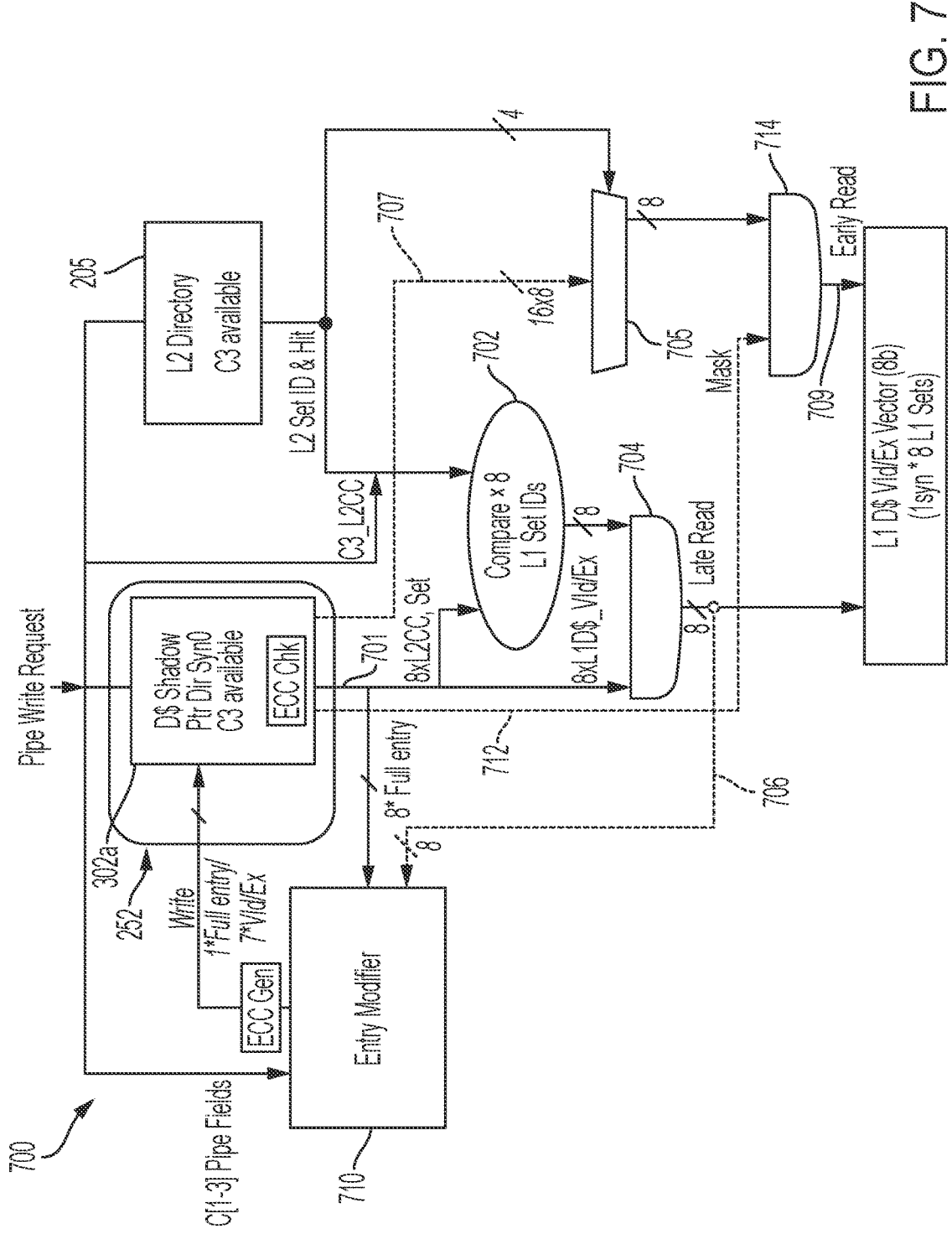
FIG. 7 is a diagram depicting a shadow pointer directory write path according to a non-limiting embodiment of the invention.

Turning now to FIG. 7, a shadow pointer directory write path 700 is illustrated according to a non-limiting embodiment of the invention. The shadow pointer directory write path 700 describes the write path associated with a single data cache shadow pointer directory (D$) synonym 302a included in the data cache shadow pointer directory (D$) 252. It should be appreciated that the same shadow pointer directory write path 700 corresponds to the remaining data cache shadow pointer directory (D$) synonyms 302b-302d, along with the instruction cache shadow pointer directory (I$) synonyms 306a-306d included in the L1 instruction cache 204.

During operation, the shadow pointer directory write path 700 can facilitate updating the shadow pointer directory 250 (e.g., the data cache shadow pointer directory (D$) 252) when installing an entry into the L1 data cache 203 without invalidating any entries in the data cache shadow pointer directory (D$) 252, or installing an entry into the L1 data cache 203 and invalidating one or more entries in the data cache shadow pointer directory (D$) 252. In one or more non-limiting embodiments, the shadow pointer directory write path 700 allows for invalidating multiple entries in the shadow pointer directory 250 (e.g., the data cache shadow pointer directory (D$) 252) simultaneously, i.e., in parallel.

The shadow pointer directory write path 700 facilitates data exchange between the data cache shadow pointer directory (D$) 252, the L2 cache 205, a comparator module 702, a write AND gate 704, and a by-pass path 708, and an entry modifier module 710. The shadow pointer directory write path 700 receives a pipe write request, which is delivered to each of the data cache shadow pointer directory (D$) 252, the L2 cache 205, and the entry modifier module 710.

The data cache shadow pointer directory (D$) 252 receives the pipe write request and outputs eight (8) full entries along a first output path 701. Each full entry includes a valid/exclusive field (L1D$_Vld/Ex) and an identifier, e.g., an L2 congruence class and set ID (L2CC,Set). The L2 cache 205 receives a pipe write request and produces a Set ID and hit information indicating whether a hit occurred in the L2 cache 205.

The comparator module 702 receives the eight L2 congruence classes and set IDs (L2CC,Set) from the data cache shadow pointer directory (D$) 252, along with the L2 Set ID and hit information from the L2 cache 205. Accordingly, the comparator module 702 compares all eight L2 congruence classes and set IDs (L2CC,Set) to the L2 Set ID and hit information to generate eight comparison results.

The write AND gate 704 receives the eight valid/exclusive fields (L1D$_Vld/Ex) along with the eight comparison results output from the comparator module 702. Accordingly, the write AND gate 704 outputs an 8-bit valid/exclusive vector (L1D$_Vld/Ex) to a first output path 706 (e.g. a late output path 706). The output 8-bit valid/exclusive vector (L1D$_Vld/Ex) indicates the location of the install or exclusive install in the data cache shadow pointer directory (D$) 252.

The by-pass path 708 provides the valid/exclusive vector (L1D$_Vld/Ex) to the entry modifier module 710 and allows the entry modifier module 710 to determine read operations based on write operations that were performed during a previous cycle. In one or more non-limiting embodiments, the by-pass path 708 allows writes to take into consideration the most recent data that is currently contained in the shadow pointer directory 252 when performing the a write operation, and allows the system to effectively "by-pass" instruction commands that may instruct a write to a certain location based on an older history of what was previously contained in the shadow pointer directory 252. In other In this manner, the by-pass path 708 allows the entry modifier 710 to only update entries for a current hit as described below.

The entry modifier module 710 receives the receives a pipe write request indicating which part of the entry to modify and how to modify the entry. In addition, the entry modifier module 710 utilizes the valid/exclusive vector (L1D$_Vld/Ex) obtained from the by-pass path 708 as a pointer to actively determine the current hit status (whether a hit occurred in the data cache shadow pointer directory (D$) 252). Accordingly, for invalidate operations the entry modifier module 710 can determine the current content of the data cache shadow pointer directory (D$) 252 and invalidate only the entries that the valid/exclusive vector (L1D$_Vld/Ex) indicates as a "hit". For entry demotions (commonly referred to as a "demote"), the entry modifier module 710 can determine the current content of the data cache shadow pointer directory (D$) 252 and turn "off" (input a "0" bit) the exclusive bit for the entries that the valid/exclusive vector (L1D$_Vld/Ex) indicates as a "hit".

According to one or more non-limiting embodiments, the by-pass path 708 facilitates an enhancement to the shadow pointer directory 250, which allows for an invalidation of lines in the shadow pointer directory 250 without protecting evicted lines from being modified by invalidates. This enhancement is referred to herein as an "asynchronous invalidation" operation and is achieved by utilizing an atomic "read-modify-write" operation when performing an invalidation. For example, when performing an write to the shadow pointer directory 250, three operations are performed: (1) data is read from the shadow pointer directory 250; (2) the read data is modified based on the type of command and the actual read data; and (3) the modified data (e.g., one entry+valid ID data for other entries) is written to the shadow pointer directory 250.

The by-pass path 708 in conjunction with the "read-modify-write" operation allows the computer processing system 200 to invalidate line (B) in a given location (X) of the shadow pointer directory 250 while servicing a fetch of line (A) to the same location without having to establish protections to block that from happening in order to maintain accuracy of the shadow pointer directory 250.

The asynchronous invalidation described herein resolves potential scenarios where it may be necessary to protect a row included in the shadow pointer directory 250, which would hit more lines that the line being fetched/invalidated, e.g., a pending L1CC. Without the by-pass path 708, the system 200 would be required to perform an invalidation for line (B) to always remove line (A) from the shadow pointer directory 250, even in an instance where the system 200 (e.g., a processor core 101) actually contains line (A). Such an invalidation would break coherency if no protection is present or in the case of protection it would cause reduced processor performance because it would cause the system 200 to block the fetch of line (A) until the invalidation of line (B) is completed in order to maintain coherency.

Figure 8:
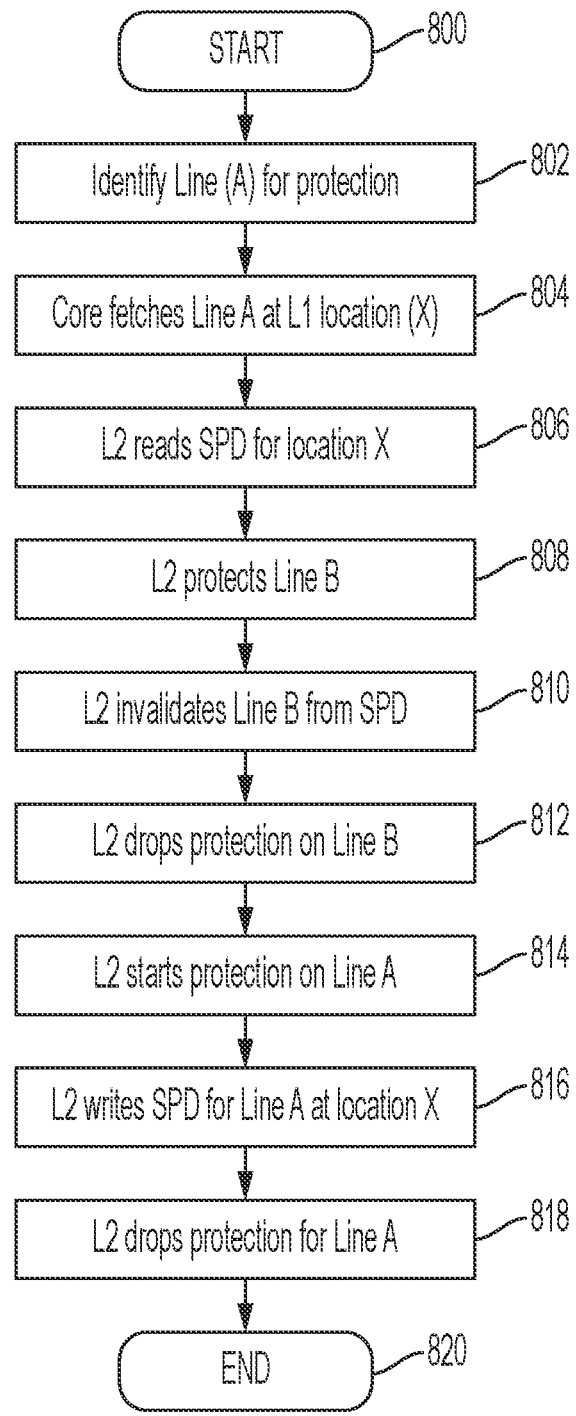
FIG. 8 is a flow diagram illustrating an invalidation sequence for invalidating a cache line without implementing a by-pass path in a shadow pointer directory write path.

FIG. 8, for example, illustrates an invalidation sequence for invalidating line B without the implementation of the by-pass path 708 in the shadow pointer directory write path 700. The sequence begins at operation 900, and at operation 902 the system 200 identifies a line (A) for protection. At operation 804, the core (e.g., processor 101) fetches line (A) from its location (X) in the L1 cache (e.g., the L1 data cache 203 or the L1 instruction cache 204). At operation 806, the L2 cache reads the shadow pointer directory 250 corresponding to location (X) of line (A), and at operation 808 the L2 cache protects line (B). At operation 810, the L2 cache invalidates line (B) from the shadow pointer directory 250, and at operation 812 the L2 cache drops protection on line (B). At operation 814, the L2 cache starts protection on line (A), and at operation 816 the L2 writes to the shadow pointer directory 250 for line (A) at its corresponding location (X). At operation 818, the L2 cache drops protection for line (A), and the sequence ends at operation 820.

Figure 9:
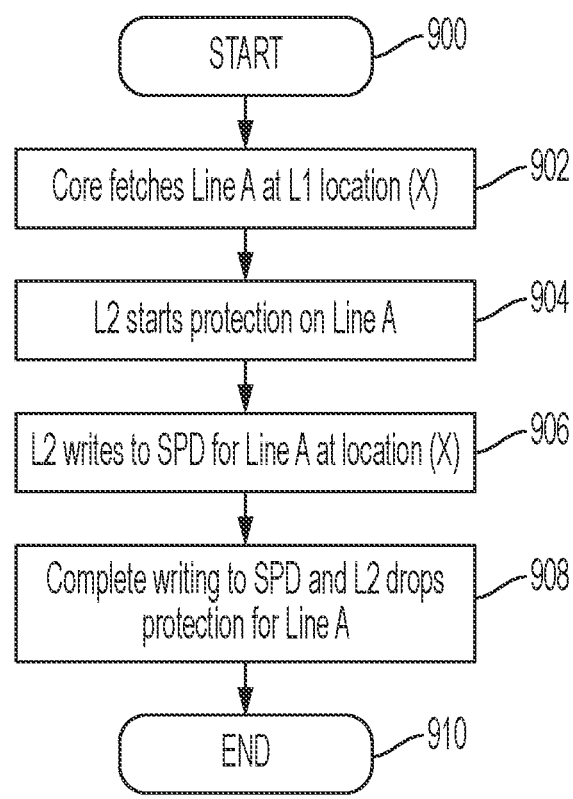
FIG. 9 is a flow diagram illustrating an invalidation sequence for invalidating a cache line using a by-pass path implemented in a shadow pointer directory write path according to a non-limiting embodiment.

Turning to FIG. 9, a sequence for invalidating line (B) that results when implementing the by-pass path 708 in the shadow pointer directory write path 700 is described according to a non-limiting embodiment. The sequence begins at operation 900, and at operation 902, the core (e.g., processor 101) fetches line (A) from its location (X) in the L1 cache. At operation 904, the L2 cache begins protection on line (A), and at operation 906 the L2 cache writes to the shadow pointer directory 250 for line (A) at location (X). At operation 908, writing to the shadow pointer directory 250 is completed and the L2 cache drops protection for line (A). After dropping protection to line (A) the method ends at operation 910. As shown in FIG. 9, implementing the by-pass path 708 in the shadow pointer directory write path 700 prevents the invalidation from blocking a fetch on line (A) and allows for significantly reducing the sequence necessary to invalidate line (B) compared to the sequence that results when the by-pass path 708 is omitted from the write path 700. Accordingly, the by-pass path 708 increases processing speeds and improves overall performance of the system 200.

As described above, the read event included in the "read-modify-write" of the asynchronous invalidation operation used to update the shadow pointer directory 250 occurs relatively late in the pipeline so that enough information is obtained in order to perform the corresponding write. When performing a read associated with an XI operation, however, it is desirable to perform the read at an earlier time compared to read performed in the "read-modify-write" (e.g., one or more cycles earlier) for practical physical design timing reasons.

Returning to FIG. 7, the shadow pointer directory 250 is further configured to perform an early valid/exclusive read-out operation (referred to as an "early read-out" operation) that is used exclusively for general cases such as read events associated with XI operations, but is not used for the "read-modify-write" associated with the asynchronous invalidation operation. To facilitate the early read-out operation, the shadow pointer directory 250 includes a second output 707 from the shadow pointer directory 250 (e.g., the shadow pointer directory (D$) synonyms 302a). The second output 707 is sixteen (16) times wider than the output delivered from the shadow pointer directory 250 to the entry modifier 210 used for the late read operation. A selector 705 receives the sixteen outputs from output path 707, along with the L2 set ID information (i.e., L2 Set ID & Hit data) output from the L2 cache 205. The selector 705 selects one of the sixteen outputs based on the L2 set ID information, and outputs the selected output as the final early valid/exclusive output along an early output path 709.

As described herein, a vector mask can be used to switch off XI vector bits when vector bits of the XI vector. Referring again to FIG. 7, the write request path 700 includes a vector mask path 712 connected between the shadow pointer directory (D$) synonyms 302a and a mask AND gate 714. When a collision situation is detected in the shadow pointer directory (D$) synonyms 302a, then the vector mask is generated and output along the vector mask path 712 to be logically applied (e.g., "ANDed)" with every bit of the early read before final vector resultant is output as the early read-out along the early output path 709. Accordingly, XI requests are prevented from being sent when the system 200 detects that an XI request is trailing behind a write/invalidate. Accordingly, the vector mask allows for outputting the selected output as the final early valid/exclusive output along an early output path 709 without causing an XI request to be sent based on old information that may have not yet been reflected in the early read-out data (e.g., the valid/exclusive data) appearing on early output path 709.

Figure 10:
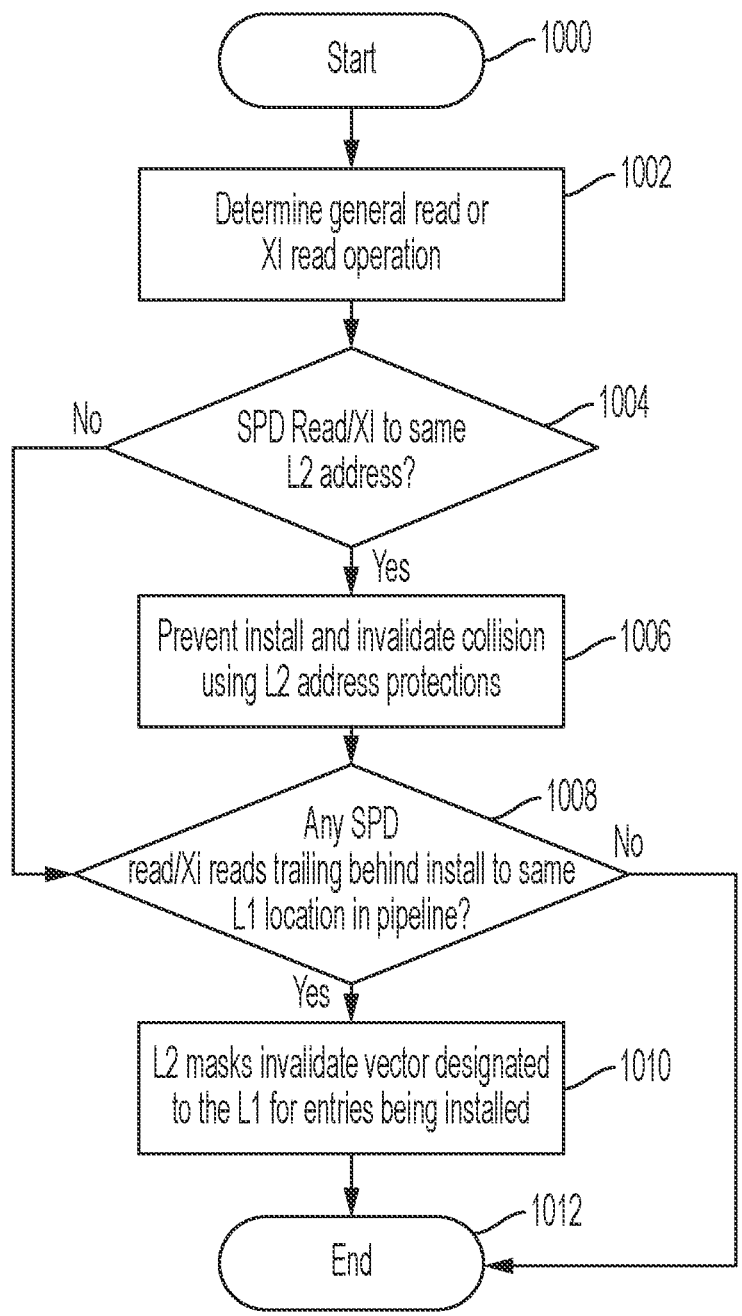
FIG. 10 is a flow diagram illustrating a method of performing the early read-out operation according to a non-limiting embodiment.

Turning now to FIG. 10, a method of performing an early read-out operation is illustrated according to a non-limiting embodiment. The method begins at operation 1000 and at operation 1002 a general SPD read operation or XI read operation is detected. At operation 1004, a determination is made as to whether a SPD read operation or XI read operation request is to a same L2 address. When a SPD read operation or XI read operation request is to a same L2 address, the system prevents an install and invalidate collision using the L2 address protections at operation 1006. When, however, a SPD read operation or XI read operation request is not to a same L2 address, a determination is made as to whether any SPD reads or XI reads trail behind an install operation to a same location in the L1 cache.

When there are no SPD reads or XI reads that trail behind an install operation to a same L1 location, the method ends at operation 1012. However, when no SPD reads or XI reads trail behind an install operation to a same L1 location, the L2 cache applies a vector mask to the invalidate vector designated to the L1 cache of which corresponding entries are being installed, and the method ends at operation 1012.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system comprising:
  a processor core; and
  a memory system in signal communication with the processor core, the memory system comprising:
    a first cache arranged at a first level of a hierarchy in the memory system and configured to store a plurality of first-cache entries; and a second cache arranged at a second level of the hierarchy that is lower than the first level, the second cache configured to store a plurality of second-cache entries,
wherein the first cache maintains a directory that contains information for each of the first-cache entries, and
wherein the second cache maintains a shadow pointer directory (SPD) that includes one or more SPD entries that maps each of the first-cache entries to a corresponding second cache entry at a lower-level cache location.

2. The computer system of claim 1, wherein the first cache and the second cache are organized according to an inclusive cache model.

3. The computer system of claim 2, wherein in response to a request to perform a cross-interrogate (XI) operation on the memory system, the shadow pointer directory provides the second cache with XI location data indicating a corresponding location of the XI within the first cache.

4. The computer system of claim 3, wherein in response to the request to perform the XI operation, the second cache generates an XI vector based on the XI location data provided by the shadow pointer directory.

5. The computer system of claim 4, wherein the shadow pointer directory includes a plurality of arrays, each array configured to store a plurality of individual synonyms.

6. The computer system of claim 5, wherein the second cache is configured to look up each array in parallel so as to filter synonyms in parallel based on the XI operation.

7. The computer system of claim 4, wherein the shadow pointer directory includes a write path configured to update the shadow pointer directory in response to installing an entry into the first cache.

8. The computer system of claim 7, wherein the write path includes a by-pass path configured to provide the second cache with read operations based on write operations that were performed during a previous cycle.

9. The computer system of claim 8, wherein the second cache updates entries based on the write operations performed during the previous cycle.

10. The computer system of claim 9, wherein the shadow pointer directory performs a read-modify-write operation to invalidate one or more SPD entries in the shadow pointer directory without protecting evicted entries from being modified by an invalidated entry.

11. The computer system of claim 10, wherein the shadow pointer directory outputs a request to perform a cross-interrogation (XI) operation, and wherein in response to requesting the XI operation the shadow pointer directory is configured to perform an early read-out operation to read the shadow pointer directory at an earlier pipeline stage, than when the read-modify-write is performed and output corresponding valid/exclusive data, and wherein the processor core generates a mask to turn off XI vector bits corresponding to reads that are trailing a write.

12. A computer-implemented method performed by a processor core that includes a memory system in signal communication with the processor core, computer-implemented method comprising:
storing a plurality of first-cache entries in a first cache arranged at a first level of a hierarchy in the memory system;
storing a plurality of second-cache entries in a second cache arranged at a second level of the hierarchy that is lower than the first level;
maintaining in the first cache a directory that contains information for each of the first-cache entries; and
maintaining in the second cache a shadow pointer directory that includes one or more SPD entries that maps each of the first-cache entries to a corresponding second cache entry at a lower-level cache location.

13. The computer-implemented method of claim 12, further comprising:
generating a cross-interrogate (XI) request to perform an XI operation on the memory system; and
providing, by the shadow pointer directory, the second cache with XI location data indicating a corresponding location of the XI within the first cache in response to generating the XI request.

14. The computer-implemented method of claim 13, wherein in response to the request to performing the XI operation, the second cache generates an XI vector based on the XI location data provided by the shadow pointer directory.

15. The computer-implemented method of claim 14, further comprising looking up, by the second cache, each array in parallel so as to filter synonyms in parallel based on the XI operation.

16. The computer-implemented method of claim 14, further comprising updating the shadow pointer directory in response to installing an entry into the first cache using a the shadow pointer directory in response to installing an entry into the first cache using a write path included in the shadow pointer directory.

17. The computer-implemented method of claim 16, further comprising providing the second cache with read operations via a by-pass path included in the write path, the read operation based on write operations that were performed during a previous cycle, wherein the second cache updates entries based on the write operations performed during the previous cycle.

18. The computer-implemented method of claim 17, further comprising performing, by the shadow pointer directory, a read-modify-write operation to invalidate one or more SPD entries in the shadow pointer directory without protecting evicted entries from being modified by an invalidated entry.

19. The computer-implemented method of claim 18, further comprising:
performing, by the shadow pointer directory, an early read-out operation to read the shadow pointer directory at an earlier pipeline stage than when the read-modify-write is performed and output corresponding valid/exclusive data;
performing, by the shadow pointer directory, the early read-out operation in response to requesting a cross-interrogation (XI) operation; and
generating, by the processor core, a mask to turn off XI vector bits corresponding to reads that are trailing a write.

20. A computer program product to control a computer system, the computer program product comprising a computer readable storage medium having program instructions embodied therewith, the program instructions executable by an electronic computer processor to control the processor to perform operations comprising:
storing a plurality of first-cache entries in a first cache arranged at a first level of a hierarchy in the memory system;

storing a plurality of second-cache entries in a second cache arranged at a second level of the hierarchy that is lower than the first level;

maintaining in the first cache a directory that contains information for each of the first-cache entries; and maintaining in the second cache a shadow pointer directory that includes one or more SPD entries that maps each of the first-cache entries to a corresponding second cache entry at a lower-level cache location.

* * * * *